(No Model.)
A. R. LEEDS.
PROCESS FOR THE PURIFICATION OF WATER.
No. 298,101. Patented May 6, 1884.
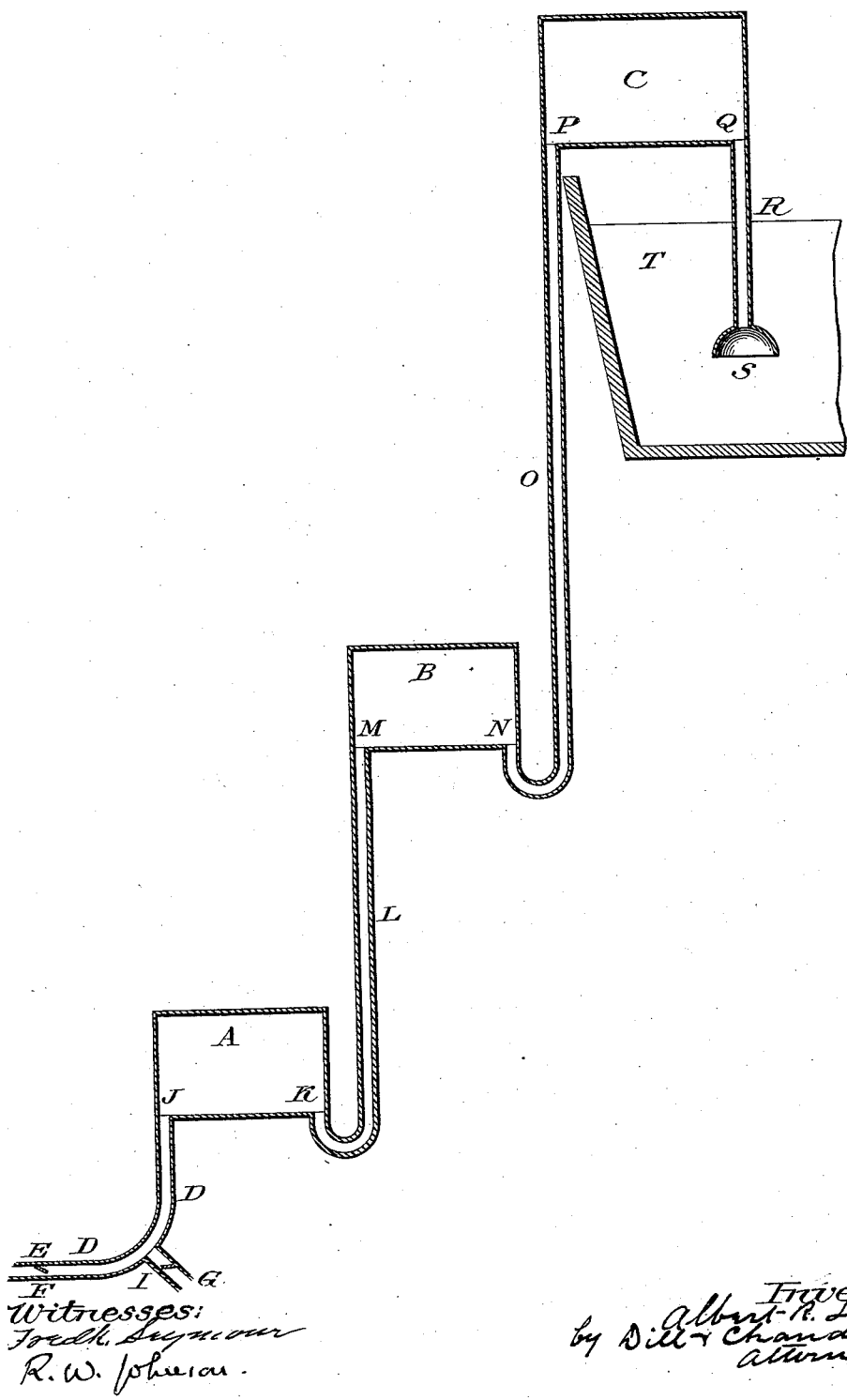

UNITED STATES PATENT OFFICE.

ALBERT R. LEEDS, OF HOBOKEN, NEW JERSEY.

PROCESS FOR THE PURIFICATION OF WATER.

SPECIFICATION forming part of Letters Patent No. 298,101, dated May 6, 1884.

Application filed November 3, 1883. (No model.)

*To all whom it may concern:*

Be known that I, ALBERT R. LEEDS, a citizen of the United States, residing at Hoboken, in the county of Hudson and State of New Jersey, have invented a new and useful Process for the Purification of Water for Domestic Use, of which the following is a specification.

In nature, water is preserved in a state of sweetness and purity by holding in solution the normal amount of oxygen gas which it is capable of dissolving at common temperatures and under ordinary atmospheric pressure; but when, by means of storage in reservoirs, wells, and cisterns, water is prevented from moving, and when, by a covering of ice or other means, it is kept out of contact with the atmosphere, when it contains organic or other matters capable of undergoing oxidation, under these circumstances water loses its proper amount of oxygen and rapidly becomes foul and unwholesome.

The object of my invention is to restore, by a rapid and powerful method of aeration, the oxygen which the water has lost by means of the agencies detailed above, and, furthermore, to utilize the power which the oxygen has of destroying deleterious substances, in order that I may thereby bring the water to a condition of purity and sweetness.

In all the various processes which have been proposed heretofore to effect the purification of water for domestic use by means of artificial aeration, the air employed for this purpose has been made use of after it has been submitted to pressure, in order to enable it to pass through the water to be aerated; but in these previous processes the application of pressure has been limited to the air and the air only, for the water itself has been subjected only to the natural or ordinary atmospheric pressure of about fifteen pounds per square inch of surface. Moreover, during the process of aeration, the water has been confined within wells, cisterns, or reservoirs, and thereby prevented from flowing. Such devices are shown in the patent of Collins, May 3, 1881, No. 240,813, and that of D'Heureuse, February 28, 1871, No. 112,266, and in that of McCurdy, October 7, 1882, No. 285,825; but the object of my invention is altogether different. It is to place the water which is undergoing aeration under great artificial pressure, and by this means to cause it to dissolve the maximum amount of oxygen possible under the conditions given. By this method of procedure my invention makes use for the first time (in the art of purifying water for domestic purposes) of the following physical law: that when air and water are brought together under artificial pressure the relative increment in the coefficient of solubility of the oxygen gas for each increment of pressure is greater than the increment in the coefficient of solubility of the nitrogen; and by the operation of this physical law the remarkable result is achieved that when air and water are brought together while both are subjected to great artificial pressure the oxygen in the compressed air will go into solution in the water to the almost entire seclusion of the nitrogen. For example, under a pressure of one hundred and twenty pounds per square inch, water will dissolve 97.3 per cent. of the oxygen of the air with which it is in contact, and only 2.7 per cent. of its nitrogen. Under ordinary atmospheric pressure, on the contrary, it is the nitrogen which goes into solution in excess, water then dissolving sixty-five per cent. of this inert gas and only thirty-five per cent. of the oxygen.

It will be observed that the air which is forced into solution by the conditions prescribed by my invention is necessarily altogether different in character from the air which is brought into solution by the methods employed in the patents hitherto granted, for while by previous methods the water is aerated with air in which the proportion of oxygen is smaller than that of the nitrogen, it is a necessary result, and one peculiar to my invention (in so far as it applies to the purification of water for domestic use) that the air which my method causes to enter into solution contains a proportion of oxygen much greater in amount than that of the nitrogen. The relative amount of oxygen is far greater when the aeration is effected by my process, for while the air which can be made to enter into solution at ordinary temperatures and atmospheric pressure is only about 6.5 cubic centimeters per liter, that which can be made to enter into solution under a pressure of one hundred and twenty pounds per square inch, or eight atmospheres (which pressure would be exerted by a column of water two hundred and seventy-two feet in height,) is something more than fifty cubic centimeters; and while the 6.5 cubic centimeters dissolved in the first case contains only 2.2 cubic centimeters of oxygen and 4.1 cubic centimeters of nitrogen, the air dissolved by my method contains forty-nine cubic centimeters of oxygen and only one cubic centimeter of nitrogen.

I am aware that the physical law above enunciated, and which my invention for the first time applies to the purification of water for domestic use, has previously been applied to the preparation of highly-oxygenized air; but in the latter process the water is kept in a state of rest in the vessel employed to confine it. With my process the water at the very outset of the operation is itself put under great artificial pressure, and this pressure is applied to it independently of the pressure to which the air is subjected. In the process for the preparation of highly-oxygenized air the conditions are reversed, the air only being subjected to artificial pressure at the outset of the operation, the only pressure to which the water is subjected being that which reaches it (as a subsequent and merely incidental feature of the operation) by transmission through the air.

I am aware that processes of aerating liquids (the air employed in these cases being carbonic-acid gas) have been employed heretofore which specify the use of artificial pressure and also the use of a closed system of pipes and air-chambers; but in these processes the water is in a state of rest in closed vessels, while in my process the water is in a state of motion. In these processes the liquids are not submitted to pressure at the beginning, nor is independent pressure applied to them at any time during the operation of charging with gas. In other words, the pressure on these liquids in the process referred to is a secondary result, due entirely to the pressure to which the gas (and the gas only) is subjected to in the first instance. This pressure thus transferred to the liquid as a secondary result is always equal to the pressure applied to the gas, while in my process, however great may be the pressure to which the water is subjected, it must always be less than that applied to the air or gas.

To carry my invention into operation any convenient mechanical arrangement such as is represented in the accompanying drawing may be used. This drawing represents a pipe, D L O R, through which water is lifted by means of the pressure applied to it by pumping-engines to a receiving-reservoir, T. This pipe forms part of a closed system, since the water cannot flow at its lowest point, being prevented by the valve E fitting into the valve-seat F; nor is the system open at the highest point, since the pipe is there recurved, and descends below the surface of the water in the receiving-reservoir T until it opens through a bell-shaped mouth, S. Beyond the valve E, but near the lowest part of the pipe, air is introduced by pumps through the tube G, which is closed against the escape of the water by means of a valve, H, fitting against a valve-seat, I. All excess of air pumped into the pipe D L O R over and above that which the water can dissolve under the conditions named is furthermore detained in this closed system by means of air-chambers A, B, and C, placed on the upward bends of the pipe, but connecting at J K and M N, &c., with this pipe. By repetition of similar mechanical arrangements the process can be carried to any desired extent. Complete details of the mechanism employed will be found in the specification of an apparatus suitable for carrying out in practice my invention for the purification of water, filed in an application of equal date herewith.

In carrying out the above-mentioned process I do not limit myself to the employment of the oxygen contained in the air; but I also desire to secure the right of using for the purpose of aeration ordinary pure oxygen, or the allotropic form of oxygen commonly called "ozone," as well as any mixture of oxygen or ozone with air, according as the varying circumstances of actual practice may require.

Having fully described my invention, what I desire to claim, and secure by Letters Patent, is—

1. In the art of purifying water, the process of saturating water with oxygen or ozone, consisting in introducing into water while in motion, under pressure, compressed air also in motion, substantially as described.

2. In the art of purifying water, the process of saturating it with oxygen or ozone by causing the water to come in contact, while under artificial pressure and in motion, with compressed air in a system of pipes and air-chambers, permitting both air and water to enter under pressure, to move through said system while under pressure, and to be discharged into a suitable reservoir, substantially as described.

ALBERT R. LEEDS.

Witnesses:
LOUIS A. CHANDLER,
EDGAR EVERHART.